United States Patent
Takahashi et al.

[11] Patent Number: 5,321,769
[45] Date of Patent: Jun. 14, 1994

[54] PRINTED MATTER INSPECTION METHOD

[75] Inventors: Tooru Takahashi; Aki Kikuchi, both of Tokyo, Japan

[73] Assignee: Ezel, Inc., Tokyo, Japan

[21] Appl. No.: 940,294

[22] Filed: Sep. 3, 1992

[30] Foreign Application Priority Data

Sep. 30, 1991 [JP] Japan ................................. 3-278696

[51] Int. Cl.$^5$ ............................................. G06K 9/00
[52] U.S. Cl. ........................................ 382/18; 382/51
[58] Field of Search ................ 382/18, 51, 54; 356/71

[56] References Cited

U.S. PATENT DOCUMENTS 4,251,799  3/1979  Jih ......................................... 382/18
5,204,910  4/1993  Lebeau ................................. 382/51

OTHER PUBLICATIONS

Rosenfeld et al., "Digital Picture Processing", Academic Press, Inc., Second Edition, vol. 2, pp. 215–217 (1982).

Primary Examiner—Leo H. Boudreau
Attorney, Agent, or Firm—Cushman, Darby & Cushman

[57] ABSTRACT

It is possible to inspect a printed matter precisely because lines are surely and accurately extracted by the present invention. Extraction of lines are the important point for the judgment if a character is correctly printed or not. The printed matter inspection method according to the present invention comprises the following steps: i) an image of a predetermined area including a line is input; ii) a density projection is performed on said input image; iii) a start point and end point of change of density are emphasized in said density projection; iv) the center pixel in each predetermined convolution is substituted by the minimal density pixel in each said convolution; v) a density projection is performed; and vi) said printed matter defective or not is judged according to said density projection in v).

11 Claims, 6 Drawing Sheets

PRINTED MATTER INSPECTION METHOD

FIELD OF THE INVENTION

The present invention relates to a method for inspecting printed material, for example, a printed serial number on a warranty.

BACKGROUND OF THE INVENTION

When judging whether a character in a predetermined area surrounded by a line is correctly printed or not, a conventional method extracts the location of the line from density projection diagram of the predetermined area and then judges the location of the printed character according to the location of the line. When thin and short lines and characters are mixed on paper, however, it is difficult to extract the information on the line only. This means that there has been an obstacle to judging the state of the printed character in the area.

SUMMARY OF THE INVENTION

The present invention solves the above problems and has an object of providing a precise method for inspecting printed material by extracting a line accurately for judging whether a character is correctly printed in a predetermined area.

A printed matter inspection method according to the present invention performs density projection on the predetermined area including a line, sharpening on the density projection and contraction on the sharpened density projection in order to extract accurately the location of the line for the judgment of the location of a character.

It is possible to extract accurately the location of a line for the judgment of the print of a character; therefore, the location of a printed character surrounded by a line can be precisely judged.

DESCRIPTION OF ALPHABETICAL MARKS (a) indicates the start point of the change of density.
(b) indicates the end point of the change of density.

PREFERRED EMBODIMENT OF THE PRESENT INVENTION

Hereinafter, a preferred embodiment of the printed matter inspection method according to the present invention is described with reference to the attached drawings.

Figure 1:
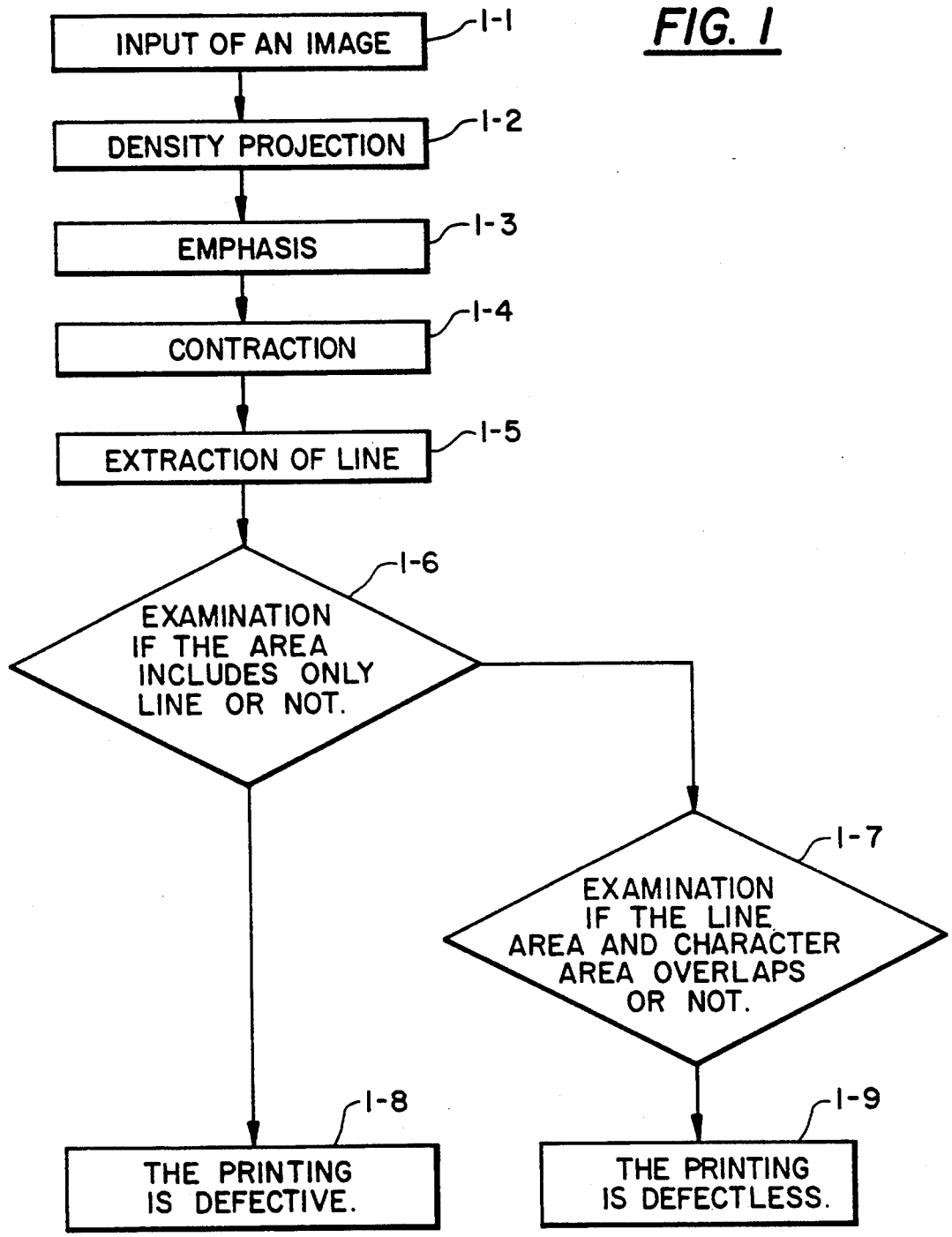
FIG. 1 shows a flowchart of an embodiment of the present invention.
Figure 2:
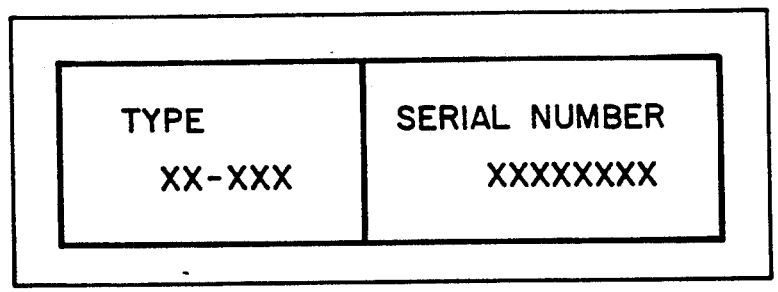
FIG. 2 shows an image of an original print.
Figure 3:
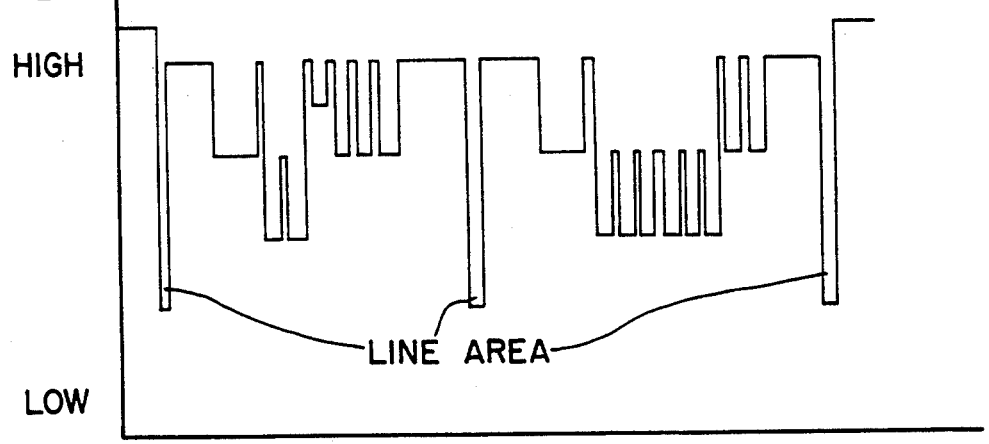
FIG. 3 shows an image of ideal density projection.
Figure 4:
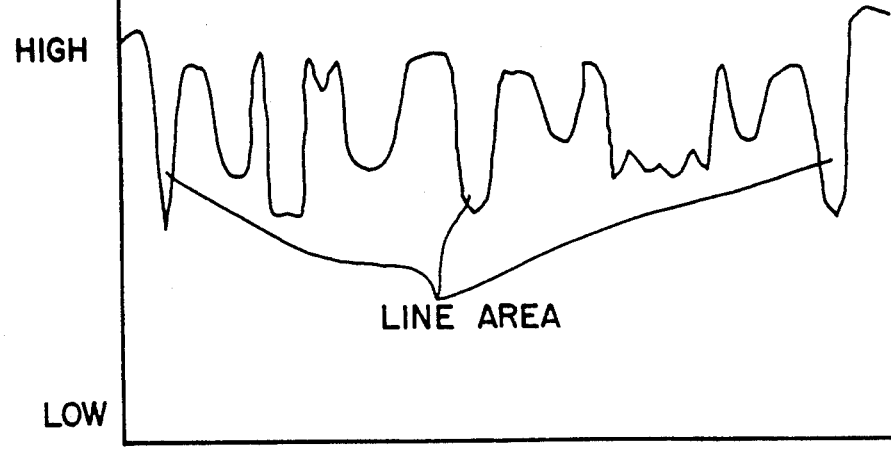
FIG. 4 shows an image of real density projection.
Figure 5:
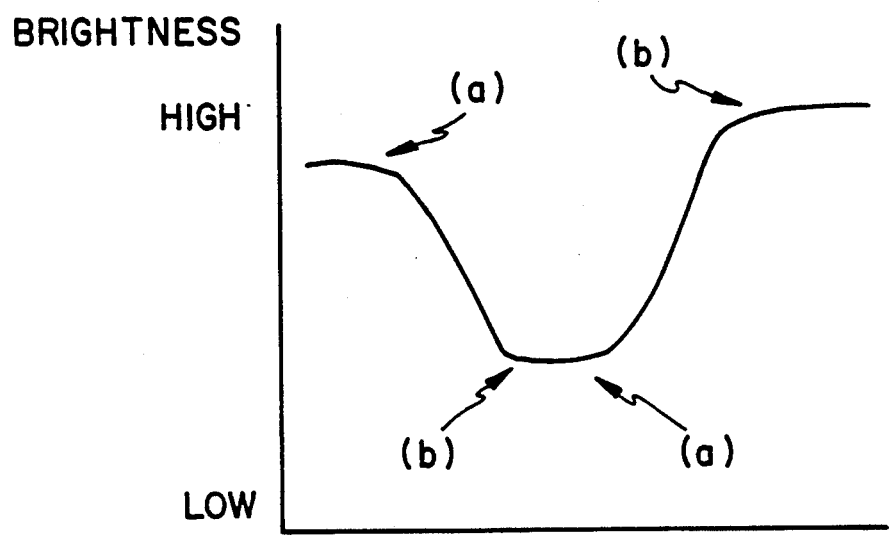
FIG. 5 shows a dull density projection including the start point and end point of the change of density.

FIG. 1 shows a flowchart of the embodiment. An image to be processed, (as shown in FIG. 2) is input by a CCD camera on step 1-1. Density projection is performed on this image in step 1-2. Here, the image on which density projection is performed has multilevel density because the information of the image is extracted as much as possible in detail. When density projection is performed, FIG. 3 is an ideal pattern of it. When the resolution of a CCD camera is low of the vertical line is short as in FIG. 2, it is difficult to extract the line because of the leak of the information of the line. The density projection diagram of FIG. 4 results from such a condition. FIG. 5 shows an enlarged part of the density projection diagram of FIG. 4 in which all the information of the line could not be extracted and the graph thus shows a dull line.

Figure 6:
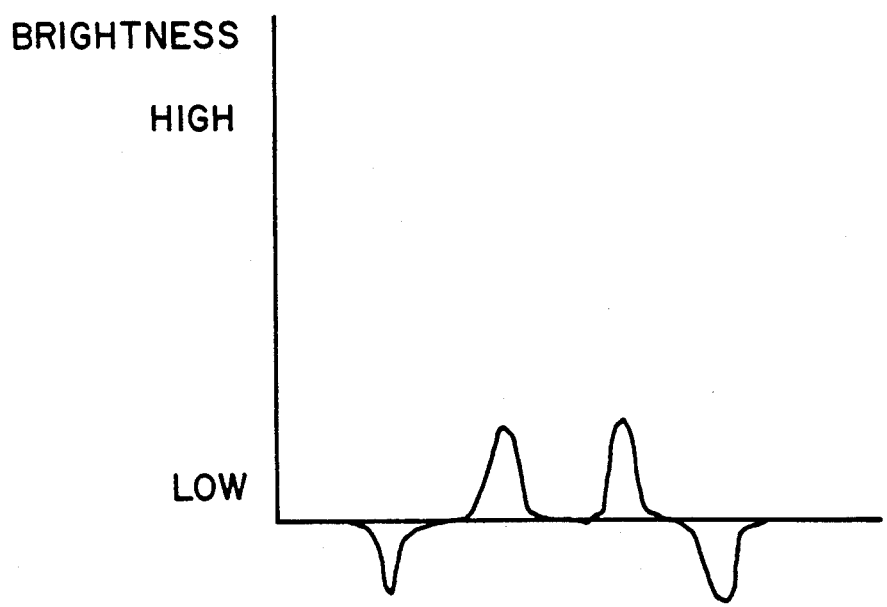
FIG. 6 shows a graph of the secondary differential.
Figure 7:
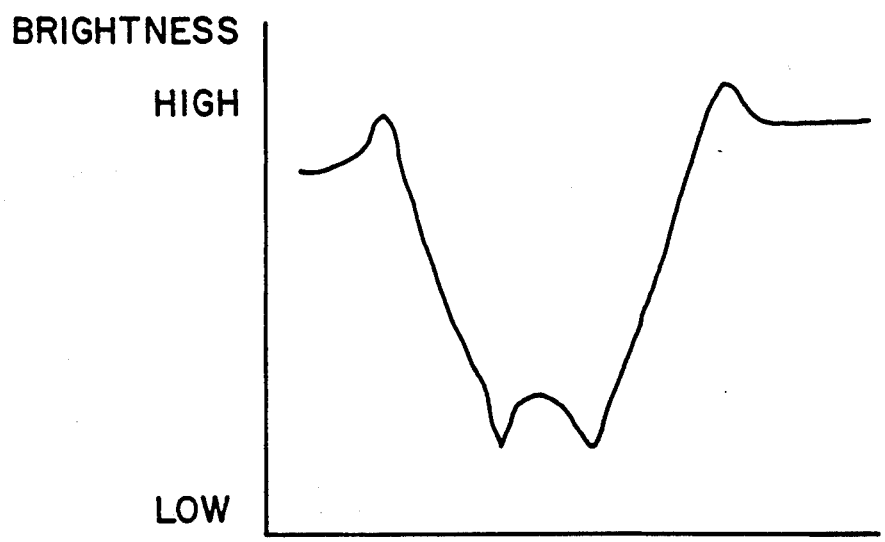
FIG. 7 shows an image obtained after sharpening FIG. 5.

The second derivative of the brightness of each coordinates as in FIG. 6. Then, the second derivative is subtracted from the each corresponding brightness in FIG. 5. The result after the subtraction is shown in FIG. 7. As shown, the shoulders of an edge are emphasized, corresponding to step 1-3 in the flowchart in FIG. 1. The "shoulders of an edge" means the start point and end point of the change of density. In FIGS. 5, (a) and (b) are the "shoulders of an edge". A coefficient can be multiplied with the value of the second derivative of a density projection so as to emphasize the shoulders of an edge furthermore. The coefficient is decided according to the dullness of the edge. As the dullness of an edge is high, the coefficient is a large value and when the dullness is a low, the coefficient is small value. The coefficient is defined in order for shoulders of an edge to be emphasized enough as in FIG. 7. Next, contraction is performed on an image obtained in this way on step 1-4 in the flowchart. The contraction takes the minimal brightness in 3×3 convolution as the center pixel. It can be calculated by the formula below.

$$E' = MIN(A,B,C,D,E,F,G,H,I)$$

In this formula, from "A" to "I" are the brightness of each pixel. "E" of the center pixel becomes "E'" through the calculation.

Figure 8:
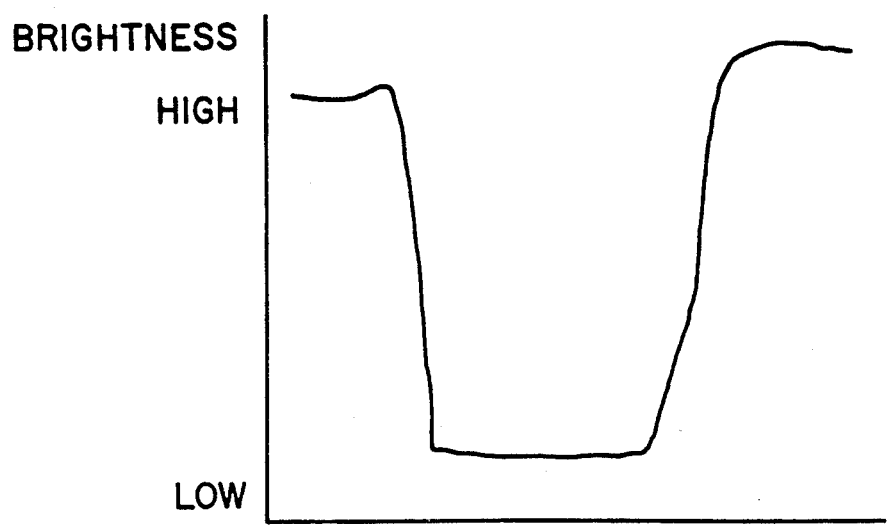
FIG. 8 shows an image obtained after contracting FIG. 7.
Figure 9:
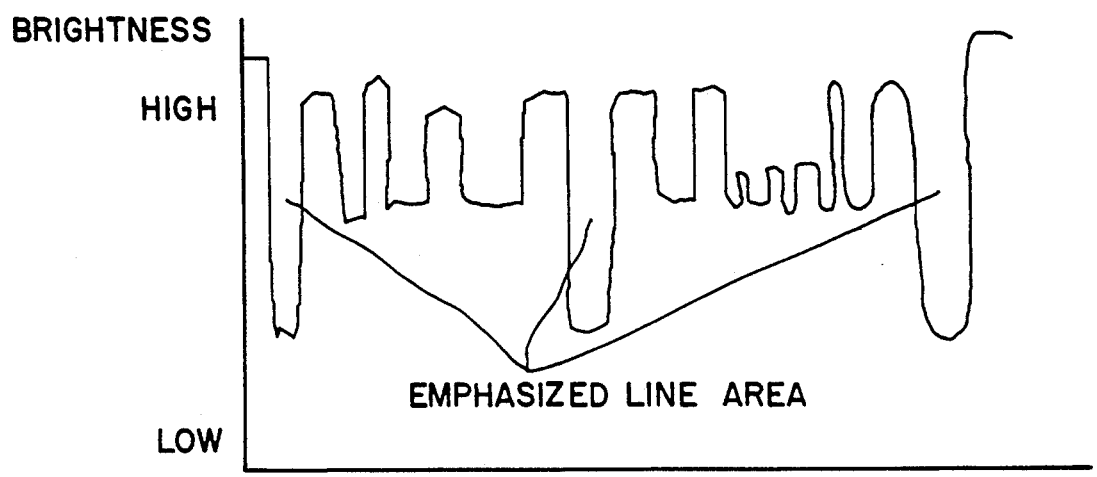
FIG. 9 shows an image obtained after sharpening and contracting FIG. 4.

FIG. 8 is the result after contraction is performed on FIG. 7. FIG. 9 is the result obtained after sharpening and contracting FIG. 4. Obviously, in FIG. 9, the line is emphasized because the part with high brightness is faint and the part with low brightness, that is, the dark part due to the line is emphasized furthermore by contraction. In this way, the line can be extracted reliably corresponding to step 114 5 in the flowchart in FIG. 1 and the location of the line is determined accurately.

Figure 12:
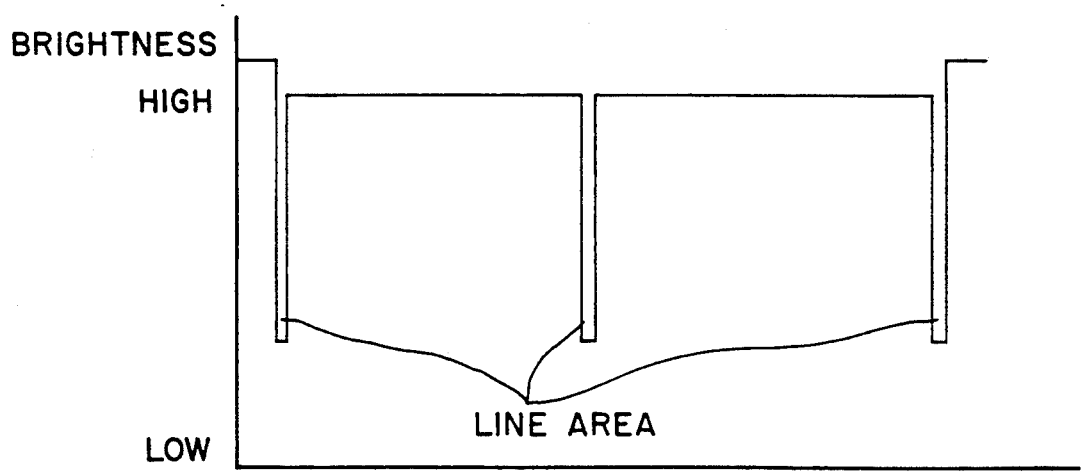
FIG. 12 shows an image of a density projection of only line without characters.

It is judged that a character is correctly printed or not on material to be inspected from the density projection in which a line is found through the above processing. When density projection shows only lines (step 114 6 in the flowchart in FIG. 1), the printed material is judged to be defective corresponding to step 1-8 in the flowchart in FIG. 1 because it means characters that should be printed are not printed. FIG. 12 shows such a case of the density projection of only a line.

Figure 10:
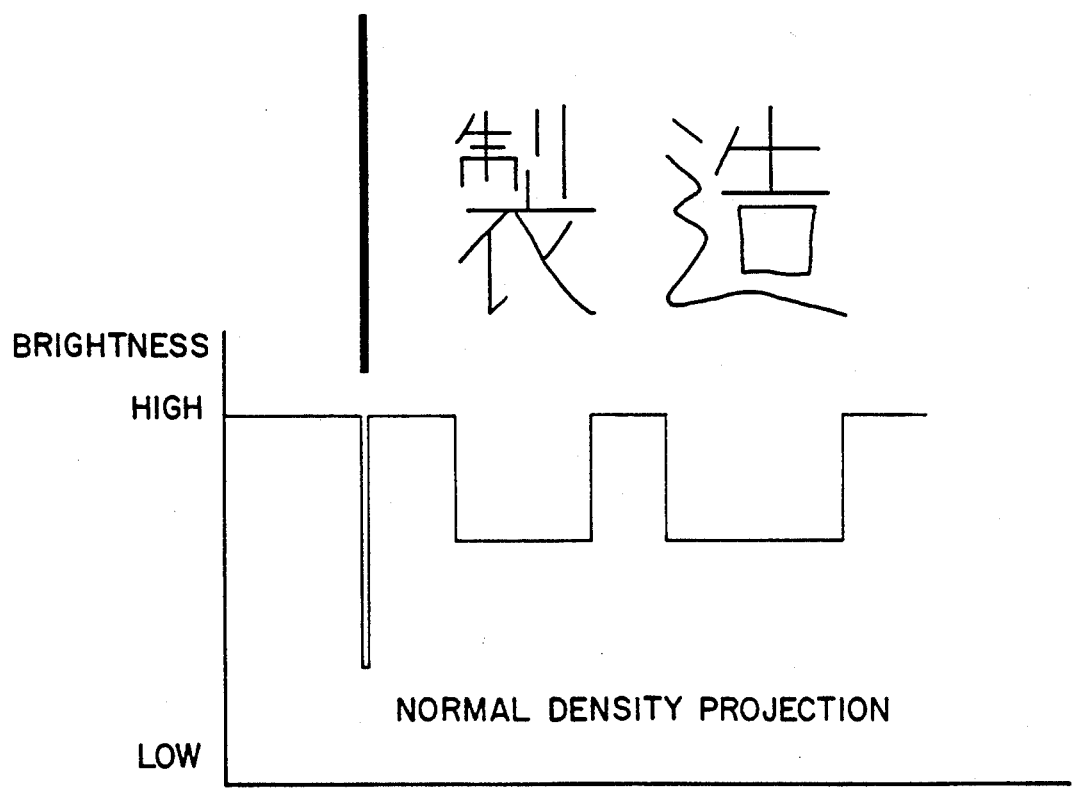
FIG. 10 shows an image of a normal density projection.
Figure 11:
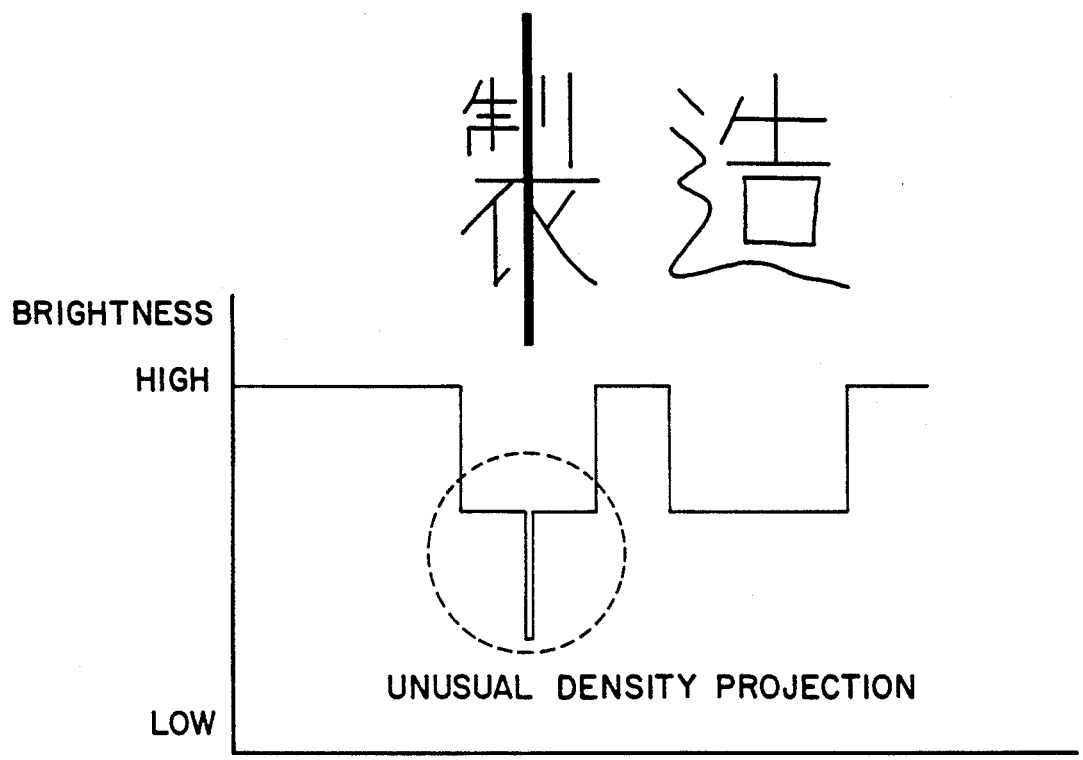
FIG. 11 shows an unusual density projection.

When it is judged that a character is included besides the line, the processing is advanced to step 1-7 in the flowchart. On step 1-7, it is judged whether the line and character overlap or not. When they do not overlap as in FIG. 10, a normal density projection is formed. On the other hand, when line and character overlap each other, an unusual density projection is formed as shown in FIG. 11. In such a case, the printed material is judged to be defective on step 1-9 in the flowchart.

The printed material is judged to be defective or not by comparing it with a template with no defect which is obtained beforehand. It is possible to execute the judgment according to statistical characteristic values such as the mean value of brightness in the area with a predetermined width from the location of the line.

As mentioned above, it is possible to inspect printed material precisely because lines are reliably and accurately extracted by the present invention: extraction of lines are the important point for judgment of whether a character is correctly printed or not. It is of course possible to apply the present invention to many other processes by emphasizing the information of position of partition.

What is claimed is:

1. A method for inspecting printed material, said method comprising the steps of:
    inputting an image of a predetermined area of said printed material, said predetermined area including a line;
    performing a first density projection operation on said input image to obtain a first density projection;
    emphasizing a start point and an end point of a change of density in said first density projection relative to remaining portions of said first density projection to obtain an emphasized projection;
    convolving at least one predetermined portion of said emphasized projection to obtain a convolved projection by replacing a center pixel in each predetermined convolved portion with a pixel in the convolved portion which has a minimal density value for that portion, thereby obtaining a convolved projection; and
    determining whether said printed matter is defective according to said convolved projection.

2. The method of claim 1, said emphasis step including the steps of:
    calculating a second derivative of brightness of a pixel in said first density projection;
    multiplying said second derivative by a scaling factor; and
    substracting said scaled second differential from said pixel brightness.

3. The method of claim 2, wherein said scaling factor is a unity scaling factor.

4. The method of claim 2, wherein said emphasis step further comprises the steps of:
    determining the dullness of an edge at a location corresponding to said pixel; and
    choosing said scaling factor based on said edge dullness.

5. The method of claim 4, said choosing step comprising the steps of:
    selecting a first scaling factor when said edge has a first dullness level; and
    selecting a second scaling factor smaller than said first scaling factor when said edge has a second dullness level lower than said first dullness level.

6. The method of claim 1, wherein pixels in said emphasized projection are arranged in a rectangular matrix, and said predetermined convolution portion is a $3 \times 3$ submatrix thereof.

7. The method of claim 1, said determining step comprising the step of determining that said printed matter is defective when said convolved density projection indicates only the presence of said line.

8. The method of claim 1, said determining step comprising the step of determining that said printed matter is defective when said convolved density projection indicates that said line overlaps with printed characters.

9. The method of claim 1, said determining step comprising the steps of:
    comparing said convolved density projection with a defect-free template; and
    determining that said printed matter is defective when said convolved density projection does not substantially correspond to said defect-free template.

10. The method of claim 1, said determining step comprising the steps of:
    calculating at least one characteristic value of portions of said convolved density projection corresponding to pixels within a predetermined distance from said line; and
    determining that said printed matter is defective based on said at least one calculated characteristic value.

11. The method of claim 10, wherein one of said at least one characteristic value is mean brightness.

* * * * *